US008681689B2

(12) United States Patent
Vitthaladevuni et al.

(10) Patent No.: US 8,681,689 B2
(45) Date of Patent: Mar. 25, 2014

(54) ADJUSTING A SINGLE-INPUT AND MULTIPLE-OUTPUT (SIMO) CHANNEL QUALITY INDICATOR (CQI)

(75) Inventors: Pavan Kumar Vitthaladevuni, San Diego, CA (US); Haitong Sun, San Diego, CA (US); Sharad Deepak Sambhwani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 286 days.

(21) Appl. No.: 13/190,294

(22) Filed: Jul. 25, 2011

(65) Prior Publication Data

US 2013/0028102 A1    Jan. 31, 2013

(51) Int. Cl.
| H04W 24/00 | (2009.01) |
| H04W 52/24 | (2009.01) |
| H04W 52/18 | (2009.01) |
| H04W 52/12 | (2009.01) |

(52) U.S. Cl.
CPC ............ H04W 52/241 (2013.01); *H04W 52/18* (2013.01); *H04W 52/12* (2013.01)
USPC ........... 370/318; 370/252; 370/328; 370/332; 370/334

(58) Field of Classification Search
CPC .................................................. H04W 52/24
USPC ......... 370/328–329, 336, 236, 281, 260, 310, 370/331–334, 252; 375/259, 260
See application file for complete search history.

(56) References Cited

U.S. PATENT DOCUMENTS

| 7,593,363 | B2 * | 9/2009 | Dottling et al. ............... 370/328 |
| 7,965,640 | B2 * | 6/2011 | Harada et al. ................. 370/236 |
| 2006/0160556 | A1 | 7/2006 | Mueller et al. |
| 2009/0316809 | A1 * | 12/2009 | Chun et al. ..................... 375/260 |
| 2010/0296462 | A1 * | 11/2010 | Taoka ............................ 370/329 |
| 2010/0296591 | A1 * | 11/2010 | Xu et al. ........................ 375/259 |
| 2011/0176519 | A1 * | 7/2011 | Vitthaladevuni et al. ...... 370/336 |
| 2012/0044842 | A1 * | 2/2012 | Nammi et al. ................. 370/281 |

FOREIGN PATENT DOCUMENTS

| EP | 1463230 A2 | 9/2004 |
| WO | 2011000420 A1 | 1/2011 |

OTHER PUBLICATIONS

International Search Report and Written Opinion—PCT/US2012/048197—ISA/EPO—Oct. 2, 2012.

* cited by examiner

*Primary Examiner* — Charles C Jiang
*Assistant Examiner* — Mohamed Kamara
(74) *Attorney, Agent, or Firm* — Darren M. Simon (57) ABSTRACT

A method for adjusting a received channel quality indicator is described. A channel quality indicator is received from a wireless communication device. A first transmission time interval for which the channel quality indicator was generated is determined. The received channel quality indicator is adjusted using an outer loop margin. The outer loop margin is dependent on a transmission mode of the first transmission time interval.

28 Claims, 8 Drawing Sheets

ADJUSTING A SINGLE-INPUT AND MULTIPLE-OUTPUT (SIMO) CHANNEL QUALITY INDICATOR (CQI)

TECHNICAL FIELD

The present disclosure relates generally to wireless communication systems. More specifically, the present disclosure relates to systems and methods for adjusting a single-input and multiple-output (SIMO) channel quality indicator (CQI).

BACKGROUND

Wireless communication systems are widely deployed to provide various types of communication content such as voice, video, data and so on. These systems may be multiple-access systems capable of supporting simultaneous communication of multiple terminals with one or more base stations.

A problem that must be dealt with in all communication systems is fading or other interference. There may be problems with decoding the signals received. One way to deal with these problems is by utilizing beamforming. With beamforming, instead of using each transmit antenna to transmit a spatial stream, the transmit antennas each transmit a linear combination of the spatial streams, with the combination being chosen so as to optimize the response at the receiver. The transmissions of the base station may be dependent on channel information received from a wireless terminal.

Smart antennas are arrays of antenna elements, each of which receive a signal to be transmitted with a predetermined phase offset and relative gain. The net effect of the array is to direct a (transmit or receive) beam in a predetermined direction. The beam is steered by controlling the phase and gain relationships of the signals that excite the elements of the array. Thus, smart antennas direct a beam to each individual mobile unit (or multiple mobile units), as opposed to radiating energy to all mobile units within a predetermined coverage area (e.g., 120°) as conventional antennas typically do. Smart antennas increase system capacity by decreasing the width of the beam directed at each mobile unit and thereby decreasing interference between mobile units. Such reductions in interference result in increases in signal-to-interference and signal-to-noise ratios that improve performance and/or capacity. In power controlled systems, directing narrow beam signals at each mobile unit also results in a reduction in the transmit power required to provide a given level of performance.

Due to the wide deployment of various terminals, a base station may communicate with many different terminals using various technologies. These technologies may sometimes interfere with each other, reducing the ability of the wireless communication system to optimally distribute data. Benefits may be realized by improved methods for evaluating channel information received by a base station from a wireless terminal.

SUMMARY

A method for adjusting a received channel quality indicator is described. A channel quality indicator is received from a wireless communication device. A first transmission time interval for which the channel quality indicator was generated is determined. The received channel quality indicator is adjusted using an outer loop margin. The outer loop margin is dependent on a transmission mode of the first transmission time interval.

The wireless communication device may be a single-input and multiple-output device. The transmission mode of the first transmission time interval may be multiple-input and multiple-output. The outer loop margin may adjust the received channel quality indicator to reflect better radio frequency conditions than were observed by the wireless communication device. Downlink transmissions to the wireless communication device may be scheduled using the adjusted channel quality indicator.

The outer loop margin may be either a first outer loop margin or a second outer loop margin. The outer loop margin may be the first outer loop margin when the transmission mode of the first transmission time interval is multiple-input and multiple-output. The outer loop margin may be the second outer loop margin when the transmission mode of the first transmission time interval is single-input and multiple-output. The second outer loop margin may adjust a transport block size for downlink transmissions to the wireless communication device.

The first transmission time interval may be determined using a minimum duration and stored downlink modes for transmission time intervals. The method may be performed by a base station that is capable of transmitting using both single-input and multiple-output and multiple-input and multiple-output. An ACK/NACK may be received from the wireless communication device. The ACK/NACK may correspond to the outer loop margin that was used to generate a transport block size corresponding to the ACK/NACK. The corresponding outer loop margin may be adjusted according to the ACK/NACK.

A wireless device configured for adjusting a received channel quality indicator is also described. The wireless device includes a processor, memory in electronic communication with the processor and instructions stored in the memory. The instructions are executable by the processor to receive a channel quality indicator from a wireless communication device. The instructions are also executable by the processor to determine a first transmission time interval for which the channel quality indicator was generated. The instructions are further executable by the processor to adjust the received channel quality indicator using an outer loop margin. The outer loop margin is dependent on a transmission mode of the first transmission time interval.

A wireless device configured for adjusting a received channel quality indicator is described. The wireless device includes means for receiving a channel quality indicator from a wireless communication device. The wireless device also includes means for determining a first transmission time interval for which the channel quality indicator was generated. The wireless device further includes means for adjusting the received channel quality indicator using an outer loop margin. The outer loop margin is dependent on a transmission mode of the first transmission time interval.

A computer-program product for adjusting a received channel quality indicator is also described. The computer-program product is a non-transitory computer-readable medium having instructions thereon. The computer-program product includes code for causing a base station to receive a channel quality indicator from a wireless communication device. The computer-program product also includes code for causing the base station to determine a first transmission time interval for which the channel quality indicator was generated. The computer-program product further includes code for causing the base station to adjust the received channel quality indicator using an outer loop margin. The outer loop margin is dependent on a transmission mode of the first transmission time interval.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE) and a base station may be referred to as a "Node B."

Figure 1:
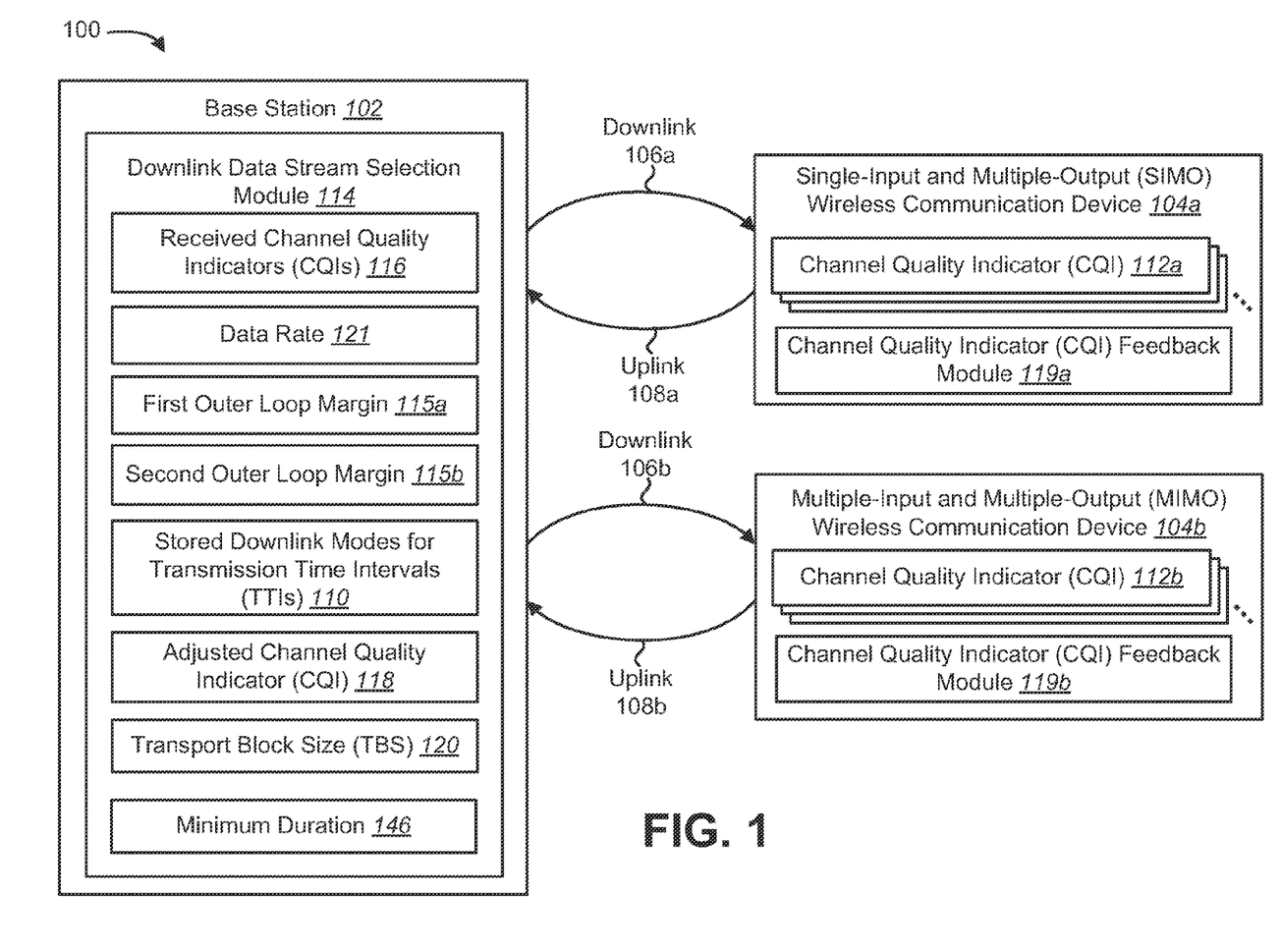
FIG. 1 shows a wireless communication system with multiple wireless devices.

FIG. 1 shows a wireless communication system 100 with multiple wireless devices. Wireless communication systems 100 are widely deployed to provide various types of communication content such as voice, data and so on. A wireless device may be a base station 102 or a wireless communication device 104.

A base station 102 is a station that communicates with one or more wireless communication devices 104. A base station 102 may also be referred to as, and may include some or all of the functionality of, an access point, a broadcast transmitter, a NodeB, an evolved NodeB, etc. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO and MISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system 100 may utilize both single-input and multiple-output (SIMO) and multiple-input and multiple-output (MIMO). The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

The base station 102 may communicate with a mix of wireless communication devices 104 that support different technologies. For example, the base station 102 may communicate with a single-input and multiple-output (SIMO) wireless communication device 104a and a multiple-input and multiple-output (MIMO) wireless communication device 104b. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc. A single-input and multiple-output (SIMO) wireless communication device 104a is a wireless communication device 104 that communicates using single-input and multiple-output (SIMO). A multiple-input and multiple-output (MIMO) wireless communication device 104b is a wireless communication device 104 that communicates using multiple-input and multiple-output (MIMO).

A wireless communication device 104 may communicate with zero, one or multiple base stations 102 on the downlink 106 and/or uplink 108 at any given moment. The downlink 106 (or forward link) refers to the communication link from a base station 102 to a wireless communication device 104, and the uplink 108 (or reverse link) refers to the communication link from a wireless communication device 104 to a base station 102.

Downlink 106 transmissions to the wireless communication devices 104a-b may be scheduled for different transmission time intervals (TTIs). For each transmission time interval (TTI), control information indicates to the wireless communication device 104 which codes within the code space will be used to send downlink payload data (data other than control data of the wireless communications system 100) to the wireless communication device 104, along with the modulation that will be used for the transmission of the downlink payload data.

Based on communications received from a base station 102, a wireless communication device 104 may generate one or more channel quality indicators (CQIs) 112*a-b*. Each channel quality indicator (CQI) 112 may be a channel measurement for the downlink 106 channel between the base station 102 and the wireless communication device 104. A channel quality indicator (CQI) 112 may be dependent on the transmission scheme used in the wireless communications system 100. Because multiple-input and multiple-output (MIMO) communication is used between the base station 102 and the multiple-input and multiple-output (MIMO) wireless communication device 104*b*, each of the channel quality indicators (CQIs) 112 generated by the multiple-input and multiple-output (MIMO) wireless communication device 104*b* may correspond to a different downlink 106*b* channel (i.e., a different transmit antenna and receive antenna pair) between the base station 102 and the multiple-input and multiple-output (MIMO) wireless communication device 104*b*.

When the base station 102 is communicating with one wireless communication device 104 during a transmission time interval (TTI), the other wireless communication devices 104 may receive these downlink 106 signals. The wireless communication devices 104 may use the received signals to generate channel quality indicators (CQIs) 112. Thus, the single-input and multiple-output (SIMO) wireless communication device 104*a* may generate channel quality indicators (CQIs) 112*a* corresponding to transmission time intervals (TTIs) when the base station 102 is transmitting to the multiple-input and multiple-output (MIMO) wireless communication device 104*b*. Likewise, the multiple-input and multiple-output (MIMO) wireless communication device 104*b* may generate channel quality indicators (CQIs) 112*b* corresponding to transmission time intervals (TTIs) when the base station 102 is transmitting to the single-input and multiple-output (SIMO) wireless communication device 104*a*. When a single-input and multiple-output (SIMO) wireless communication device 104*a* generates channel quality indicators (CQIs) 112*a* based on received downlink signals that were intended for a multiple-input and multiple-output (MIMO) wireless communication device 104*b* (and thus were transmitted using multiple antennas), the single-input and multiple-output (SIMO) wireless communication device 104*a* will observe additional interference due to the use of additional antennas and thereby generate an inaccurate channel quality indicator (CQI) 112*a*.

A wireless communication device 104 may generate multiple channel quality indicators (CQIs) 112 for each transmission time interval (TTI). A wireless communication device 104 may not send every channel quality indicator (CQI) 112 to the base station 102 for every transmission time interval (TTI). In the current standard, a wireless communication device 104 may send only the optimal channel quality indicator (CQI) 112 to the base station 102 for each transmission time interval (TTI).

Each wireless communication device 104 may include a channel quality indicator (CQI) feedback module 119*a-b*. A channel quality indicator (CQI) feedback module 119 may be used by the wireless communication device 104 to determine which channel quality indicator (CQI) 112 to send to the base station 102.

A wireless communication device 104 may transmit the channel quality indicators (CQIs) 112 to the base station 102 via the uplink 108 channel. The base station 102 may thus receive channel quality indicators (CQIs) 116 from many wireless communication devices 104 corresponding to many downlink 106 channels. The base station 102 may include a downlink data stream selection module 114. The downlink data stream selection module 114 may include the received channel quality indicators (CQIs) 116. The downlink data stream selection module 114 may use the received channel quality indicators (CQIs) 116 to determine scheduling for each wireless communication device 104.

The downlink data stream selection module 114 may include a data rate 121. The data rate 121 may refer to the bit rate of a downlink 106 data stream. The downlink data stream selection module 114 may also include a first outer loop margin 115*a* and a second outer loop margin 115*b*. The first outer loop margin 115*a* may be an adjustment that the base station 102 applies to a received channel quality indicator (CQI) 116 (and thus to the corresponding data rate 121 and transport block size (TBS) 120) when the base station 102 believes that the received channel quality indicator (CQI) 116 is accurate. For example, the first outer loop margin 115*a* may be applied to a received channel quality indicator (CQI) 116 from a multiple-input and multiple-output (MIMO) wireless communication device 104*b*. This is because a multiple-input and multiple-output (MIMO) wireless communication device 104*b* may generate an accurate channel quality indicator (CQI) 112*b* for a transmission time interval (TTI) regardless of whether the base station 102 transmits using single-input and multiple-output (SIMO) or multiple-input and multiple-output (MIMO).

In contrast, a single-input and multiple-output (SIMO) wireless communication device 104*a* may be unable to generate an accurate channel quality indicator (CQI) 112*a* for a transmission time interval (TTI) if the base station 102 has transmitted using multiple-input and multiple-output (MIMO) in the transmission time interval (TTI). This is because the single-input and multiple-output (SIMO) wireless communication device 104*a* cannot cancel out the interference from the additional antenna (or antennas) used by the base station 102 during multiple-input and multiple-output (MIMO) transmissions. Thus, a received channel quality indicator (CQI) 116 from a single-input and multiple-output (SIMO) wireless communication device 104*a* may be inaccurate if the channel quality indicator (CQI) 112*a* was generated in response to a transmission time interval (TTI) that used multiple-input and multiple-output (MIMO).

If the base station 102 uses an inaccurate channel quality indicator (CQI) 116 to schedule transmissions to a wireless communication device 104 in a transmission time interval (TTI), the performance in that transmission time interval (TTI) may be sub-optimal. For example, a channel quality indicator (CQI) 112*a* generated by a single-input and multiple-output (SIMO) wireless communication device 104*a* during a multiple-input and multiple-output (MIMO) transmission time interval (TTI) may negatively reflect the radio conditions between the base station 102 and the single-input and multiple-output (SIMO) wireless communication device 104*a*. This may lead to the base station 102 using a smaller transport block size (TBS) 120 for scheduled transmissions to the single-input and multiple-output (SIMO) wireless communication device 104*a* than is optimal.

To account for inaccurate received channel quality indicators (CQIs) 116, the base station 102 may use the second outer loop margin 115*b*. The base station 102 may apply the second outer loop margin 115*b* (instead of the first outer loop margin 115*a*) to received channel quality indicators (CQIs) 116 from a single-input and multiple-output (SIMO) wireless communication device 104*a* that were generated during a transmission time interval (TTI) when the base station 102 was transmitting using multiple-input and multiple-output (MIMO). The second outer loop margin 115b may thus adjust the received channel quality indicators (CQIs) 116 to reflect a better radio frequency (RF) environment (i.e., better radio frequency (RF) conditions) between the base station 102 and the single-input and multiple-output (SIMO) wireless communication device 104a than was observed by the single-input and multiple-output (SIMO) wireless communication device 104a.

The base station 102 may include stored downlink modes 110 for transmission time intervals (TTIs). The base station 102 may use the stored downlink modes 110 for transmission time intervals (TTIs) to determine whether a received channel quality indicator (CQI) 116 should be adjusted using the first outer loop margin 115a or the second outer loop margin 115b. When a channel quality indicator (CQI) 116 is received by the base station 102 from a single-input and multiple-output (SIMO) wireless communication device 104a, the base station 102 may determine whether a multiple-input and multiple-output (MIMO) transmission or a single-input and multiple-output (SIMO) transmission was scheduled by the cell during the transmission time interval (TTI) corresponding to the received channel quality indicator (CQI) 116. This may be accomplished using the stored downlink modes 110 for transmission time intervals (TTIs) and a minimum duration 146. The minimum duration 146 reflects the minimum amount of time between when a wireless communication device 104 generates a channel quality indicator (CQI) 112 and the base station 102 uses the channel quality indicator (CQI) 112 to adjust scheduling. The minimum duration 146 is discussed in additional detail below in relation to FIG. 4.

The received channel quality indicator (CQI) 116 may then be adjusted by either the first outer loop margin 115a or the second outer loop margin 115b to obtain an adjusted channel quality indicator (CQI) 118. An adjustment to the received channel quality indicator (CQI) 116 by the second outer loop margin 115b may adjust (i.e., increase or decrease) the transport block size (TBS) 120 for downlink 106 transmissions to the single-input and multiple-output (SIMO) wireless communication device 104a.

Figure 2:
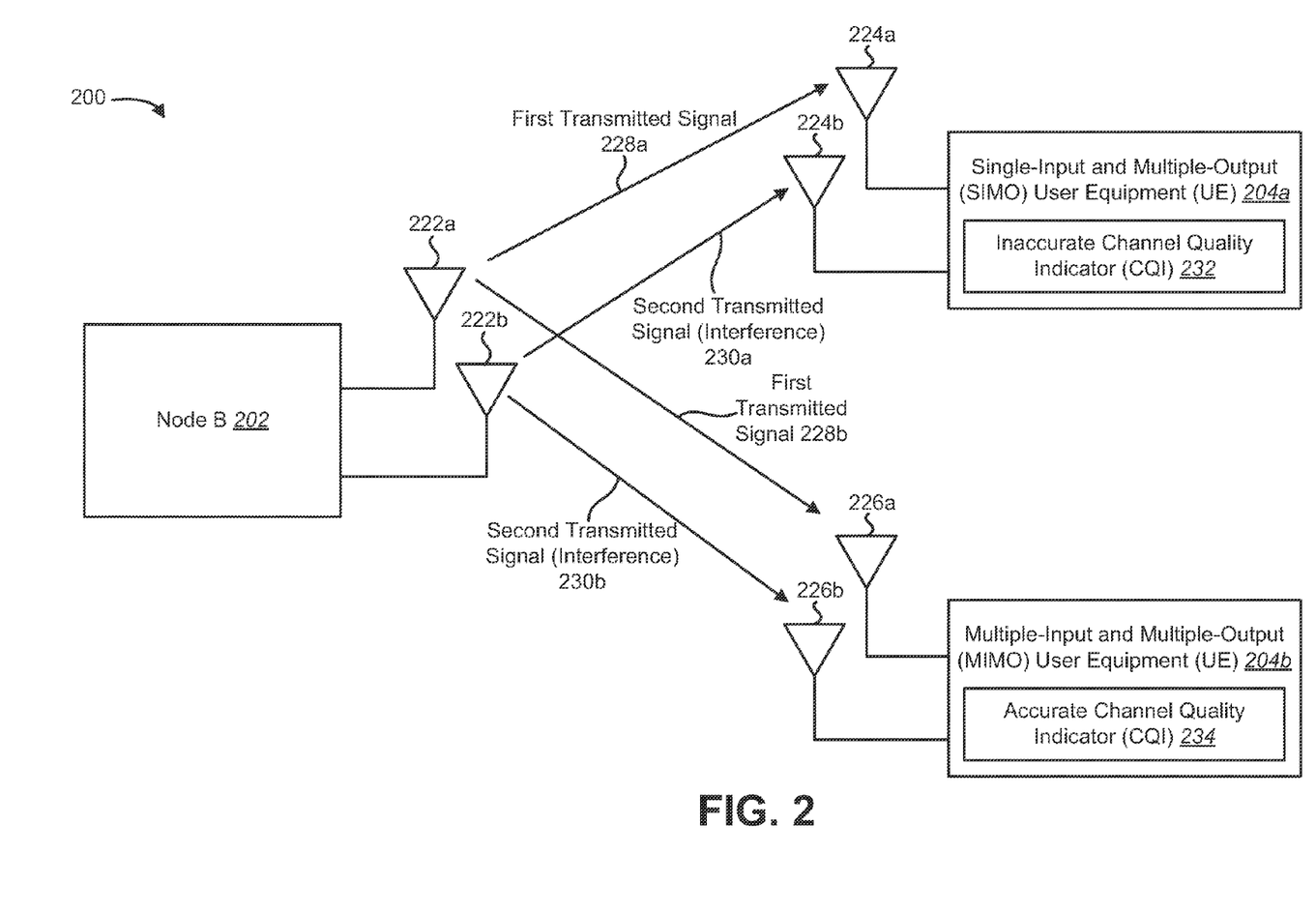
FIG. 2 is a block diagram illustrating a multiple-input and multiple-output (MIMO) transmission in a wireless communication system with multiple wireless devices.

FIG. 2 is a block diagram illustrating a multiple-input and multiple-output (MIMO) transmission in a wireless communication system 200 with multiple wireless devices. The wireless communication system 200 may include a Node B 202, a single-input and multiple-output (SIMO) user equipment (UE) 204a and a multiple-input and multiple-output (MIMO) user equipment (UE) 204b. The Node B 202 of FIG. 2 may be one configuration of the base station 102 of FIG. 1. The single-input and multiple-output (SIMO) user equipment (UE) 204a of FIG. 2 may be one configuration of the single-input and multiple-output (SIMO) wireless communication device 104a of FIG. 1. The multiple-input and multiple-output (MIMO) user equipment (UE) 204b of FIG. 2 may be one configuration of the multiple-input and multiple-output (MIMO) wireless communication device 104b of FIG. 1.

The Node B 202 may include a first antenna 222a and a second antenna 222b. During multiple-input and multiple-output (MIMO) transmissions, the Node B 202 may transmit a first transmitted signal 228a-b using the first antenna 222a and a second transmitted signal 230a-b using the second antenna 222b. During single-input and multiple-output (SIMO) transmissions, the Node B 202 may transmit using only one of the antennas 222 (i.e., either the first antenna 222a or the second antenna 222b). The multiple-input and multiple-output (MIMO) user equipment (UE) 204b may also include a first antenna 226a and a second antenna 226b. The multiple-input and multiple-output (MIMO) user equipment (UE) 204b may generate an accurate channel quality indicator (CQI) 234 for a transmission time interval (TTI) that uses either multiple-input and multiple-output (MIMO) transmissions or single-input and multiple-output (SIMO) transmissions.

The single-input and multiple-output (SIMO) user equipment (UE) 204a may also include a first antenna 224a and a second antenna 224b. During single-input and multiple-output (SIMO) transmissions, the single-input and multiple-output (SIMO) user equipment (UE) 204a may use both the first antenna 224a and the second antenna 224b to receive signals transmitted from the base station 102. This may be referred to as diversity reception. Thus, the single-input and multiple-output (SIMO) user equipment (UE) 204a may generate an accurate channel quality indicator (CQI) 112a for a transmission time interval (TTI) with single-input and multiple-output (SIMO) transmissions. However, for a multiple-input and multiple-output (MIMO) transmission time interval (TTI), the single-input and multiple-output (SIMO) user equipment (UE) 204a may be unable to cancel out the second transmitted signal 230a transmitted by the second antenna 222b on the Node B 202. This is one reason why scheduling single-input and multiple-output (SIMO) user equipments (UE) 204a and multiple-input and multiple-output (MIMO) user equipments (UE) 204b should not be scheduled simultaneously. The single-input and multiple-output (SIMO) user equipment (UE) 204a may see the second transmitted signal 230a as interference, and the single-input and multiple-output (SIMO) user equipment (UE) 204a may generate an inaccurate channel quality indicator (CQI) 232 corresponding to the multiple-input and multiple-output (MIMO) transmission time interval (TTI).

Figure 3:
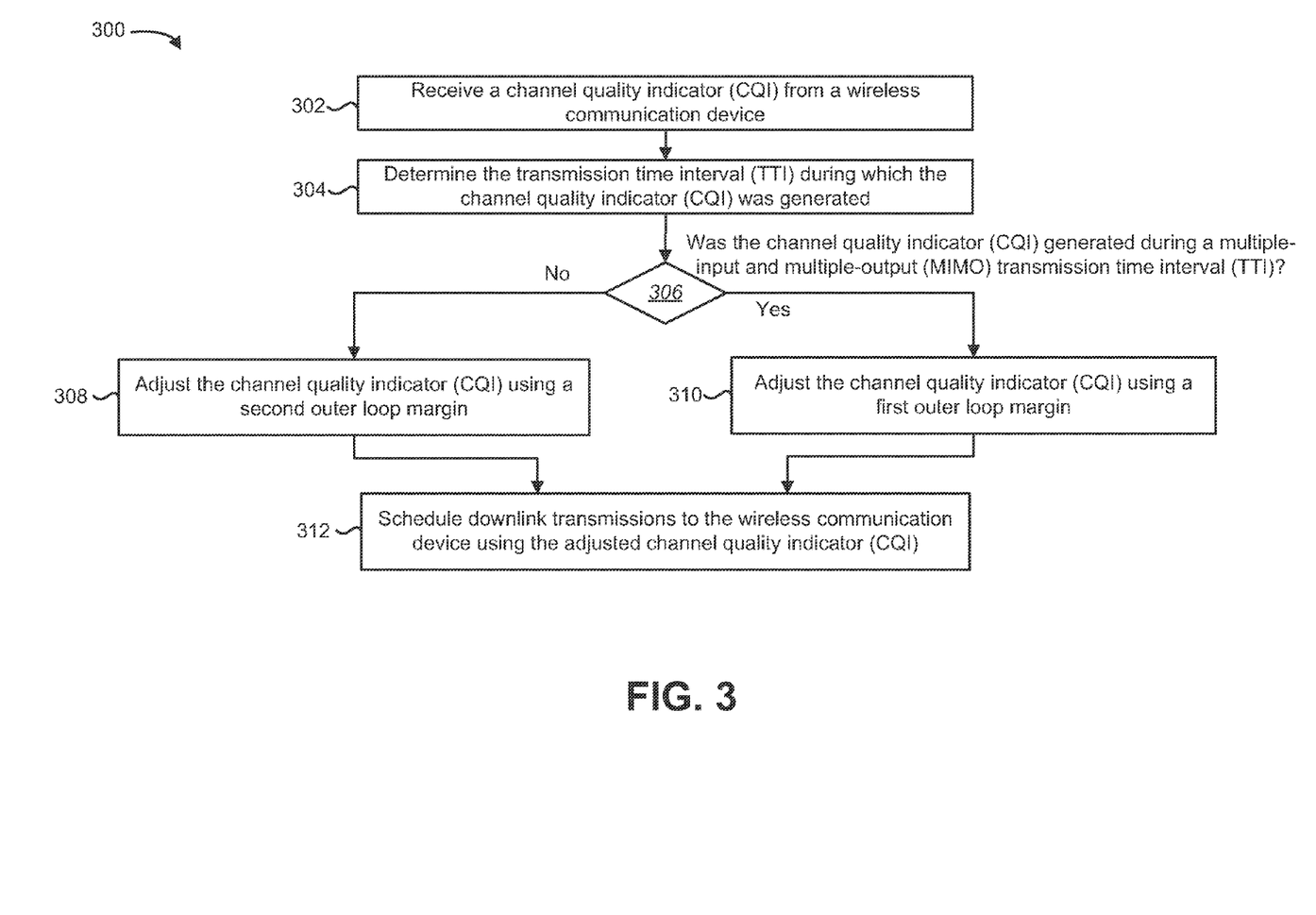
FIG. 3 is a flow diagram of a method for adjusting a received channel quality indicator (CQI)

FIG. 3 is a flow diagram of a method 300 for adjusting a received channel quality indicator (CQI) 116. The method 300 may be performed by a base station 102. In one configuration, the base station 102 may be a Node B 202. The base station 102 may receive 302 a channel quality indicator (CQI) 116 from a wireless communication device 104. The wireless communication device 104 may be a single-input and multiple-output (SIMO) wireless communication device 104a. The base station 102 may determine 304 the transmission time interval (TTI) during which the channel quality indicator (CQI) 116 was generated. Determining 304 the transmission time interval (TTI) during which the channel quality indicator (CQI) 116 was generated is discussed in further detail below in relation to FIG. 5. The base station 102 may then determine 306 whether the channel quality indicator (CQI) 116 was generated during a multiple-input and multiple-output (MIMO) transmission time interval (TTI). A multiple-input and multiple-output (MIMO) transmission time interval (TTI) is a transmission time interval (TTI) in which the base station 102 transmitted using multiple-input and multiple-output (MIMO).

If the channel quality indicator (CQI) 116 was not generated during a multiple-input and multiple-output (MIMO) transmission time interval (TTI), the base station 102 may adjust 308 the channel quality indicator (CQI) 116 using a second outer loop margin 115b. The base station 102 may then schedule 312 downlink transmissions to the wireless communication device 104 using the adjusted channel quality indicator (CQI) 118. If the channel quality indicator (CQI) 116 was generated during a multiple-input and multiple-output (MIMO) transmission time interval (TTI), the base station 102 may adjust 310 the channel quality indicator (CQI) 116 using a first outer loop margin 115a. The base station 102 may then schedule 312 downlink transmissions to the wireless communication device 104 using the adjusted channel quality indicator (CQI) 118.

Figure 4:
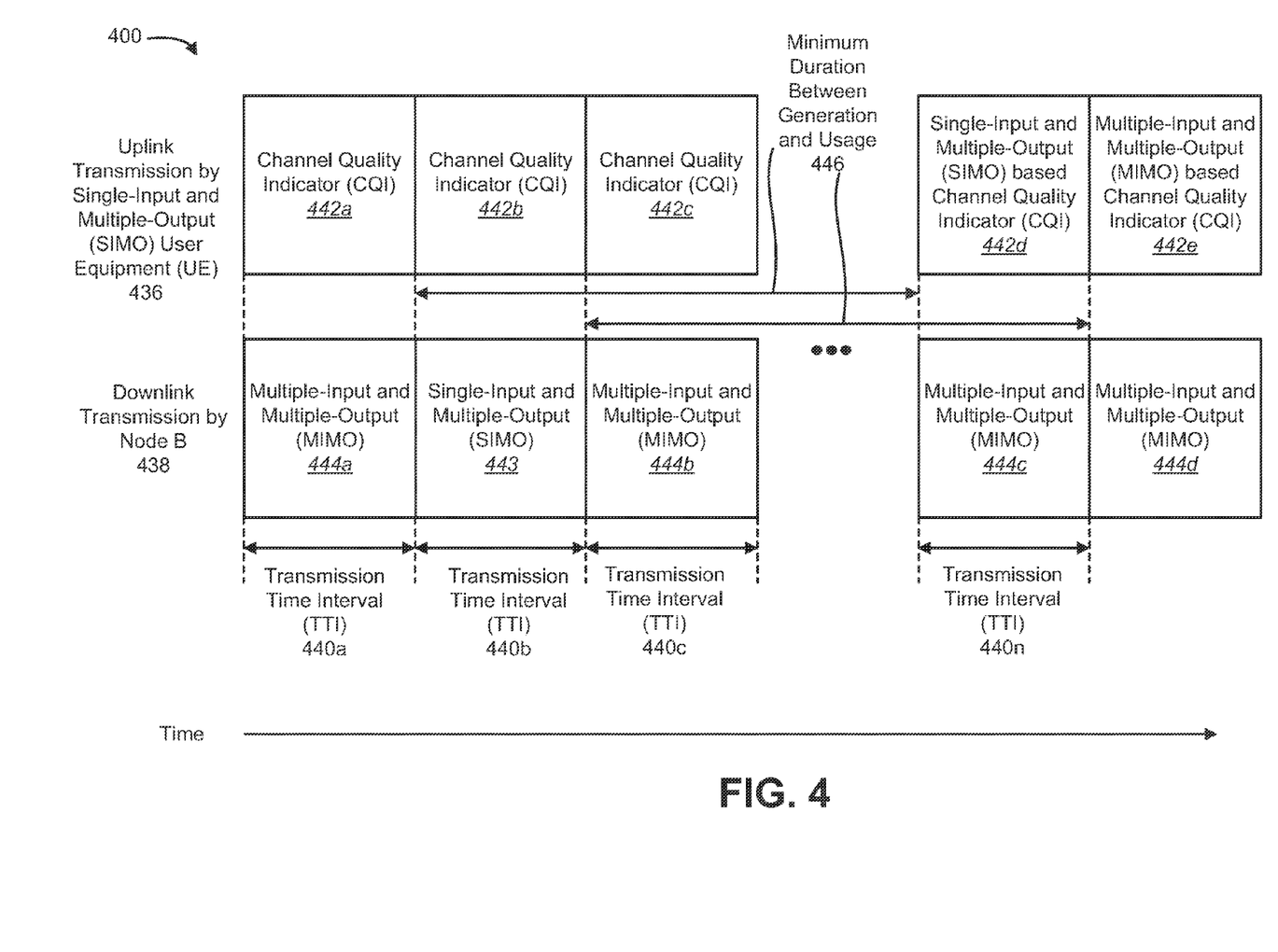
FIG. 4 is a block diagram illustrating a timeline with multiple transmission time intervals (TTIs)

FIG. 4 is a block diagram illustrating a timeline 400 with multiple transmission time intervals (TTIs). A Node B 202 may send downlink transmissions 438 that are received by a single-input and multiple-output (SIMO) user equipment (UE) 204a. Some of the downlink transmissions 438 sent by the Node B 202 may not be directed towards the single-input and multiple-output (SIMO) user equipment (UE) 204a, and may instead be directed to another user equipment (UE) 204 (such as a multiple-input and multiple-output (MIMO) user equipment (UE) 204). However, the single-input and multiple-output (SIMO) user equipment (UE) 204a may use the received downlink transmissions 438 to generate a channel quality indicator (CQI) 442a-e. For each downlink transmission 438 by the Node B 202 in a transmission time interval (TTI) 440a-n, the single-input and multiple-output (SIMO) user equipment (UE) 204a may generate and transmit 436 a channel quality indicator (CQI) 442 to the Node B 202.

The Node B 202 may communicate with multiple user equipments (UEs) 204. Some of the user equipments (UEs) 204 may be single-input and multiple-output (SIMO) user equipments (UEs) 204a while other user equipments (UEs) 204 are multiple-input and multiple-output (MIMO) user equipments (UEs) 204b. Thus, the Node B 202 may switch between downlink transmissions 438 that are single-input and multiple-output (SIMO) (e.g., the single-input and multiple-output (SIMO) downlink transmission 443) and downlink transmissions 438 that are multiple-input and multiple-output (MIMO) (e.g., the multiple-input and multiple-output (MIMO) downlink transmissions 444a-d). For each transmission time interval (TTI) 440a-n, a downlink transmission 438 may be either single-input and multiple-output (SIMO) 443 or multiple-input and multiple-output (MIMO) 444 (but not both).

There may be a minimum duration 446 between generation and usage of a channel quality indicator (CQI) 442. In other words, there may be a minimum delay from when a user equipment (UE) 204 generates a channel quality indicator (CQI) 442 to when the Node B 202 has received the channel quality indicator (CQI) 442 and used it to adjust downlink scheduling to the user equipment (UE) 204. The minimum duration 446 between generation and usage may depend on the processing time of the user equipment (UE) 204 generating the channel quality indicator (CQI) 442 and the processing time of the Node B 202 receiving the channel quality indicator (CQI) 442. For the system, the minimum duration 446 between generation and usage is fixed (and not variable). Once the user equipment (UE) 204 sends a channel quality indicator (CQI) 442, the Node B 202 may use it after a period T. The period T has a minimum value that is known at the Node B 202. The Node B 202 may use the minimum value of the period T to determine the transmission time interval (TTI) 440 for which a channel quality indicator (CQI) 442 was generated.

In the second transmission time interval (TTI) 440b, a single-input and multiple-output (SIMO) downlink transmission 443 is used by the Node B 202. During the single-input and multiple-output (SIMO) downlink transmission 443, the single-input and multiple-output (SIMO) user equipment (UE) 204a may generate a single-input and multiple-output (SIMO) based channel quality indicator (CQI) 442d. The single-input and multiple-output (SIMO) user equipment (UE) 204a may then send the generated single-input and multiple-output (SIMO) based channel quality indicator (CQI) 442d to the Node B 202. The Node B 202 may not know which transmission time interval (TTI) 440 a received channel quality indicator (CQI) 442 corresponds to. The Node B 202 may need to determine the transmission time interval (TTI) 440 corresponding to the channel quality indicator (CQI) 442 to determine the downlink transmission mode 110 used by the Node B 202 (and thus to determine the accuracy of the received channel quality indicator (CQI) 442). The Node B 202 may use the minimum duration 446 between generation and usage to estimate the transmission time interval (TTI) 440 corresponding to the single-input and multiple-output (SIMO) based channel quality indicator (CQI) 442b (i.e., the second transmission time interval (TTI) 440b with a single-input and multiple-output (SIMO) downlink transmission 443).

In the third transmission time interval (TTI) 440c, a multiple-input and multiple-output (MIMO) downlink transmission 444b is used by the Node B 202. During the multiple-input and multiple-output (MIMO) downlink transmission 444b, the single-input and multiple-output (SIMO) user equipment (UE) 204a may generate a multiple-input and multiple-output (MIMO) based channel quality indicator (CQI) 442e. The single-input and multiple-output (SIMO) user equipment (UE) 204a may then send the multiple-input and multiple-output (MIMO) based channel quality indicator (CQI) 442e to the Node B 202. The Node B 202 may use the minimum duration 446 between generation and usage to determine that the multiple-input and multiple-output (MIMO) based channel quality indicator (CQI) 442e was generated during a multiple-input and multiple-output (MIMO) downlink transmission 444b in the third transmission time interval (TTI) 440c.

The use of the minimum duration 446 between generation and usage may not work if a user equipment (UE) 204 averages channel quality indicators (CQIs) 442 over a few transmission time intervals (TTIs) 440 and then reports the averaged channel quality indicator (CQI) 112. However, the use of minimum duration 446 between generation and usage may be used when a user equipment (UE) 204 does not average the channel quality indicator (CQI) 442 over more than one transmission time interval (TTI) 440.

Figure 5:
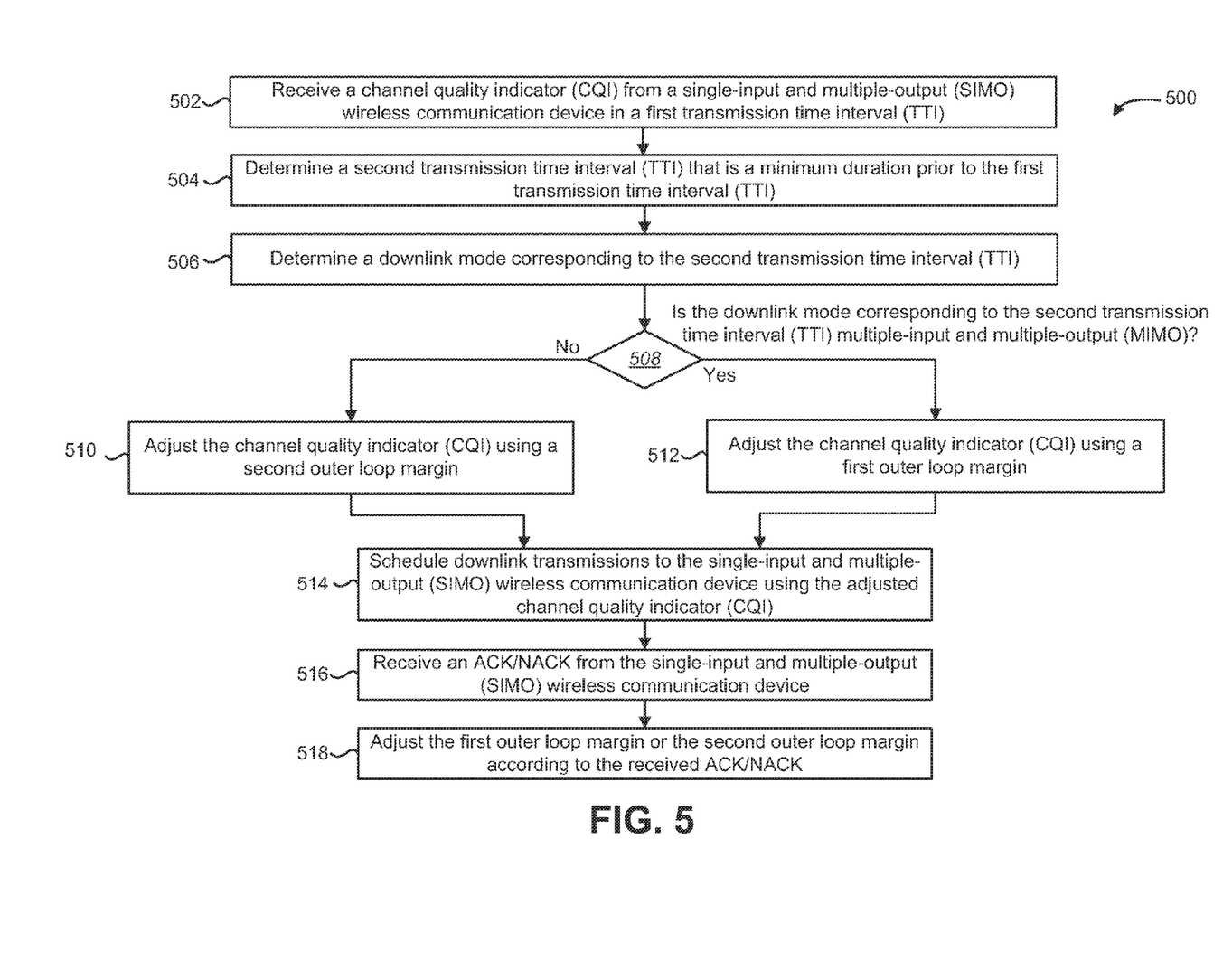
FIG. 5 is a flow diagram of another method for adjusting a received channel quality indicator (CQI)

FIG. 5 is a flow diagram of another method 500 for adjusting a received channel quality indicator (CQI) 116. The method 500 may be performed by a base station 102. In one configuration, the base station 102 may be a Node B 202. The base station 102 may receive 502 a channel quality indicator (CQI) 116 from a single-input and multiple-output (SIMO) wireless communication device 104a in a first transmission time interval (TTI) 440. The base station 102 may determine 504 a second transmission time interval (TTI) 440 that is a minimum duration 146 prior to the first transmission time interval (TTI) 440. The minimum duration 146 may be the minimum duration 446 between generation and usage.

The base station 102 may determine 506 a downlink mode 110 corresponding to the second transmission time interval (TTI) 440. The base station 102 may then determine 508 whether the downlink mode 110 corresponding to the second transmission time interval (TTI) 440 is multiple-input and multiple-output (MIMO) or not (i.e., single-input and multiple-output (SIMO)). If the downlink mode 110 corresponding to the second transmission time interval (TTI) 440 is multiple-input and multiple-output (MIMO), the base station 102 may adjust 512 the channel quality indicator (CQI) 116 using a first outer loop margin 115a. The base station 102 may then schedule 514 downlink transmissions 438 to the single-input and multiple-output (SIMO) wireless communication device 104a using the adjusted channel quality indicator (CQI) 118.

If the downlink mode 110 corresponding to the second transmission time interval (TTI) 440 is not multiple-input and multiple-output (MIMO) (and thus is single-input and multiple-output (SIMO)), the base station 102 may adjust 510 the channel quality indicator (CQI) 116 using a second outer loop margin 115b. The base station 102 may then schedule 514 downlink transmissions 438 to the single-input and multiple-output (SIMO) wireless communication device 104a using the adjusted channel quality indicator (CQI) 118. Scheduling 514 downlink transmissions 438 to the single-input and multiple-output (SIMO) wireless communication device 104a may include calculating a transport block size (TBS) 120 for the downlink transmissions 438.

The base station 102 may receive 516 an ACK/NACK from the single-input and multiple-output (SIMO) wireless communication device 104a. The ACK/NACK may correspond to the downlink transmissions 438 that were scheduled according to the adjusted channel quality indicator (CQI) 118. The base station 102 may adjust 518 the first outer loop margin 115a or the second outer loop margin 115b according to the received ACK/NACK. For a single-input and multiple-output (SIMO) user equipment (UE) 204a, the base station 102 may know whether the received ACK corresponds to a transmission where the base station 102 used the first outer loop margin 115a or the second outer loop margin 115b to adjust the channel quality indicator (CQI) 118 and determine the transport block size (TBS). The outer loop margin 115 used to generate the transport block size (TBS) may be referred to as the corresponding outer loop margin. The base station 102 may know whether to adjust 518 the first outer loop margin 115a or the second outer loop margin 115b.

Figure 6:
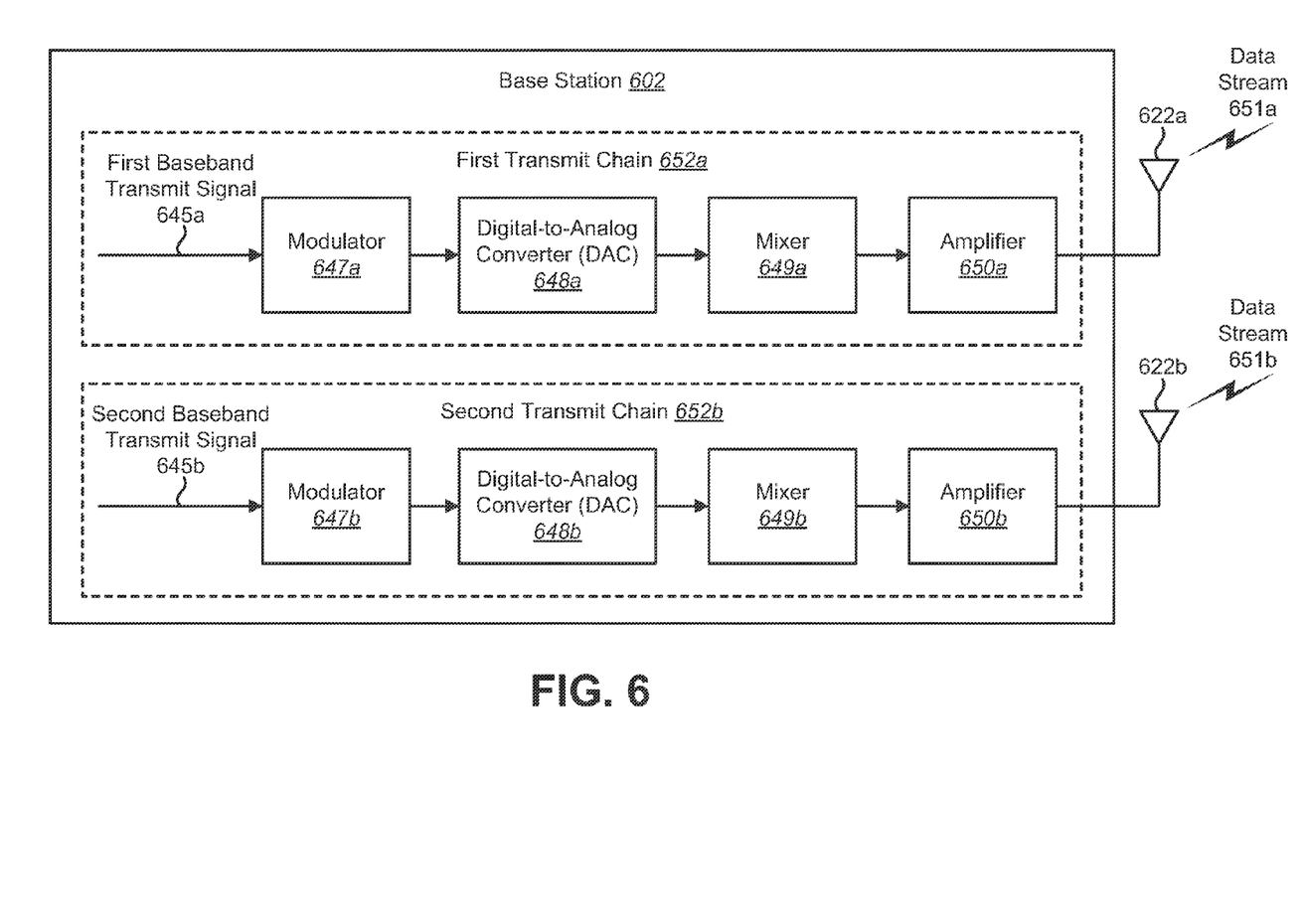
FIG. 6 is a block diagram of a base station for use in the present systems and methods.

FIG. 6 is a block diagram of a base station 602 for use in the present systems and methods. The base station 602 of FIG. 6 may be one configuration of the base station 102 of FIG. 1. The base station 602 may include a first transmit chain 652a and a second transmit chain 652b. The first transmit chain 652a may be used for a first data stream 651a and the second transmit chain 652b may be used for a second data stream 651b.

The first transmit chain 652a may include a first baseband transmit signal 645a. The first baseband transmit signal 645a may be modulated using a modulator 647a, converted from a digital signal to an analog signal using a digital-to-analog converter (DAC) 648a, frequency converted using a mixer 649a, amplified using an amplifier 650a and finally transmitted by a first antenna 622a as the first data stream 651a. Likewise, the second transmit chain 652b may include a second baseband transmit signal 645b. The second baseband transmit signal 645b may be modulated using a modulator 647b, converted from a digital signal to an analog signal using a digital-to-analog converter (DAC) 648b, frequency converted using a mixer 649b, amplified using an amplifier 650b and finally transmitted by a second antenna 622b as the second data stream 651b. As discussed above, the first data stream 651a and the second data stream 651b may be transmitted during the same transmission time interval (TTI) 440 using the same orthogonal variable spreading factor (OVSF) codes with orthogonal beams.

Figure 7:
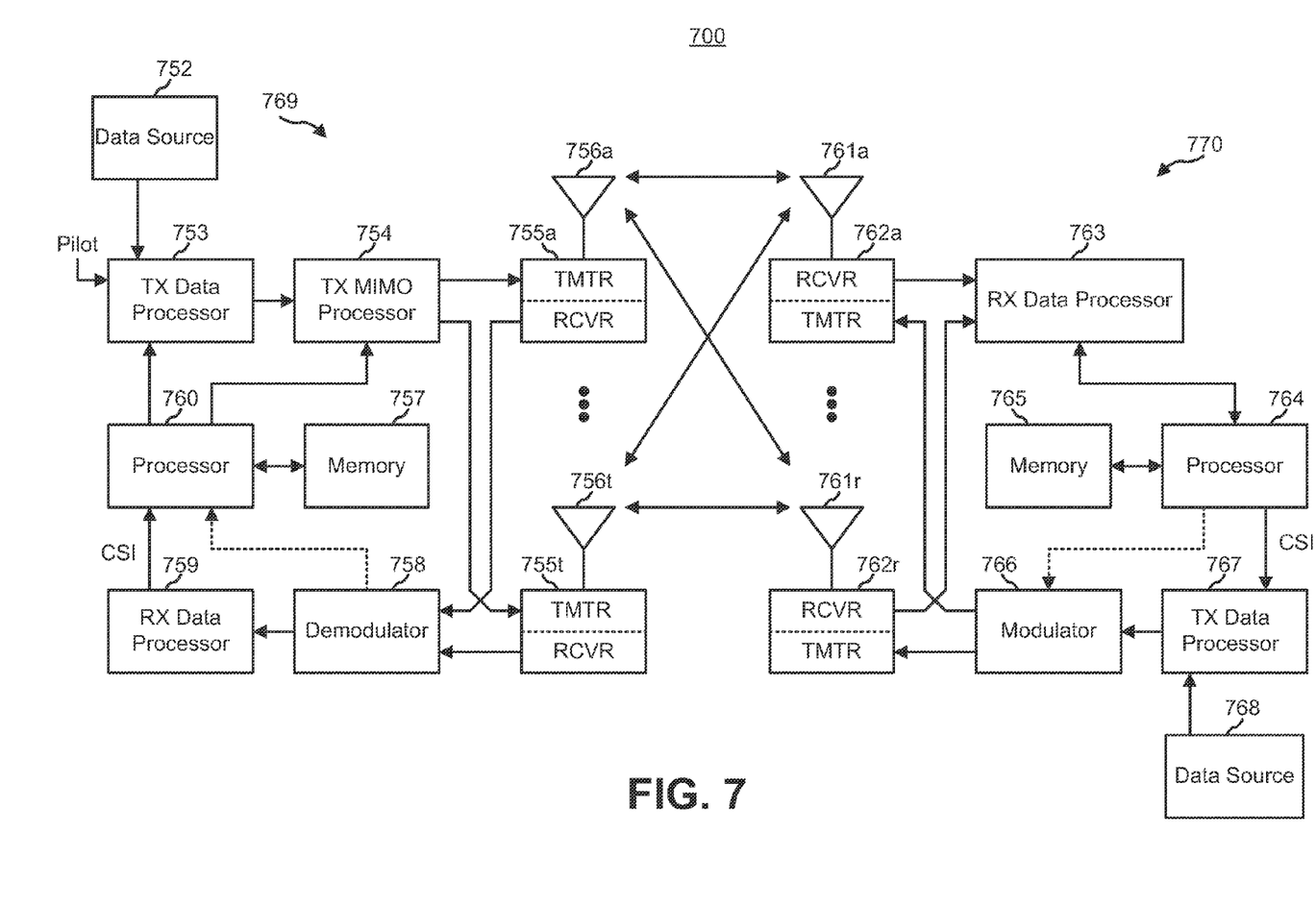
FIG. 7 is a block diagram of a transmitter and receiver in a multiple-input and multiple-output (MIMO) system.

FIG. 7 is a block diagram of a transmitter 769 and receiver 770 in a multiple-input and multiple-output (MIMO) system 700. In the transmitter 769, traffic data for a number of data streams is provided from a data source 752 to a transmit (TX) data processor 753. Each data stream may then be transmitted over a respective transmit antenna 756a through 756t. The transmit (TX) data processor 753 may format, code and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 770 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 754, which may further process the modulation symbols (e.g., for OFDM). The transmit (TX) multiple-input multiple-output (MIMO) processor 754 then provides NT modulation symbol streams to NT transmitters (TMTR) 755a through 755t. The TX transmit (TX) multiple-input multiple-output (MIMO) processor 754 may apply beamforming weights to the symbols of the data streams and to the antenna 756 from which the symbol is being transmitted.

Each transmitter 755 may receive and process a respective symbol stream to provide one or more analog signals, and further condition (e.g., amplify, filter and upconvert) the analog signals to provide a modulated signal suitable for transmission over the multiple-input and multiple-output (MIMO) channel. NT modulated signals from transmitters 755a through 755t are then transmitted from NT antennas 756a through 756t, respectively.

At the receiver 770, the transmitted modulated signals are received by NR antennas 761a through 761r and the received signal from each antenna 761 is provided to a respective receiver (RCVR) 762a through 762r. Each receiver 762 may condition (e.g., filter, amplify and downconvert) a respective received signal, digitize the conditioned signal to provide samples, and further process the samples to provide a corresponding "received" symbol stream.

An RX data processor 763 then receives and processes the NR received symbol streams from NR receivers 762 based on a particular receiver processing technique to provide NT "detected" symbol streams. The RX data processor 763 then demodulates, deinterleaves and decodes each detected symbol stream to recover the traffic data for the data stream. The processing by RX data processor 763 is complementary to that performed by TX multiple-input and multiple-output (MIMO) processor 754 and TX data processor 753 at transmitter system 769.

A processor 764 may periodically determine which precoding matrix to use. The processor 764 may store information on and retrieve information from memory 765. The processor 764 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 767, which also receives traffic data for a number of data streams from a data source 768, modulated by a modulator 766, conditioned by transmitters 762a through 762r, and transmitted back to the transmitter 769.

At the transmitter 769, the modulated signals from the receiver are received by antennas 756, conditioned by receivers 755, demodulated by a demodulator 758, and processed by an RX data processor 759 to extract the reverse link message transmitted by the receiver system 770. A processor 760 may receive channel state information (CSI) from the RX data processor 759. The processor 760 may store information on and retrieve information from memory 757. The processor 760 then determines which pre-coding matrix to use for determining the beamforming weights and then processes the extracted message.

Figure 8:
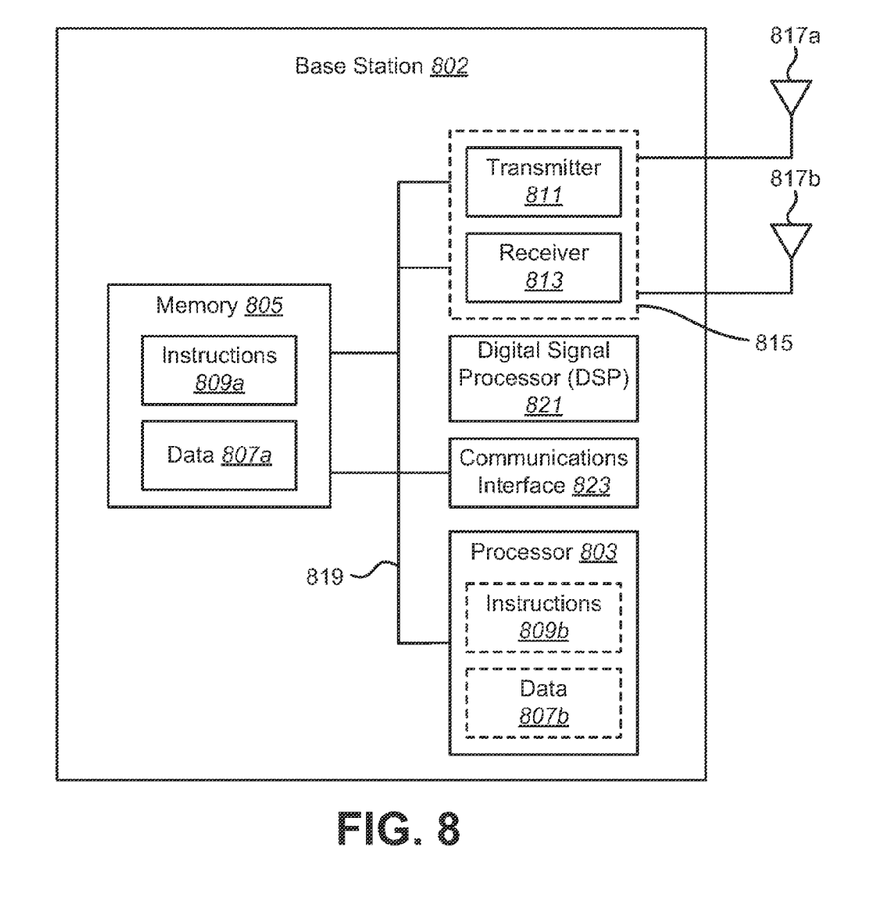
FIG. 8 illustrates certain components that may be included within a base station.

FIG. 8 illustrates certain components that may be included within a base station 802. A base station 802 may also be referred to as, and may include some or all of the functionality of, an access point, a broadcast transmitter, a NodeB, an evolved NodeB, etc. The base station 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the base station 802 of FIG. 8, in an alternative configuration, a combination of processors (e.g., an ARM and DSP) could be used.

The base station 802 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The base station 802 may also include a transmitter 811 and a receiver 813 to allow transmission and reception of signals to and from the base station 802. The transmitter 811 and receiver 813 may be collectively referred to as a transceiver 815. Multiple antennas 817a-b may be electrically coupled to the transceiver 815. The base station 802 may also include (not shown) multiple transmitters, multiple receivers, multiple transceivers and/or additional antennas.

The base station 802 may include a digital signal processor (DSP) 821. The base station 802 may also include a communications interface 823. The communications interface 823 may allow a user to interact with the base station 802.

The various components of the base station 802 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3 and 5, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for adjusting a received channel quality indicator, comprising:
    receiving a channel quality indicator (CQI) from a wireless communication device;
    determining a first transmission time interval for which the CQI was generate;
    determining a transmission mode of the first transmission time interval based on stored downlink modes for transmission time intervals and a minimum duration between when the wireless communication device generates the CQI and when the CQI is used to adjust scheduling; and
    adjusting the CQI using an outer loop margin, wherein the outer loop margin is dependent on the transmission mode of the first transmission time interval.

2. The method of claim 1, wherein the wireless communication device is a single-input and multiple-output device.

3. The method of claim 1, wherein the transmission mode of the first transmission time interval is multiple-input and multiple-output.

4. The method of claim 1, wherein the outer loop margin adjusts the CQI to reflect better radio frequency conditions than were observed by the wireless communication device.

5. The method of claim 1, further comprising scheduling downlink transmissions to the wireless communication device using the adjusted CQI.

6. The method of claim 1, wherein the outer loop margin is either a first outer loop margin or a second outer loop margin.

7. The method of claim 6, wherein the outer loop margin is the first outer loop margin when the transmission mode of the first transmission time interval is multiple-input and multiple-output, and wherein the outer loop margin is the second outer loop margin when the transmission mode of the first transmission time interval is single-input and multiple-output.

8. The method of claim 7, wherein the second outer loop margin adjusts a transport block size for downlink transmissions to the wireless communication device.

9. The method of claim 1, wherein the method is performed by a base station that is capable of transmitting using both single-input and multiple-output and multiple-input and multiple-output.

10. The method of claim 1, further comprising:
    receiving an ACK/NACK from the wireless communication device, wherein the ACK/NACK corresponds to the outer loop margin that was used to generate a transport block size corresponding to the ACK/NACK; and
    adjusting the corresponding outer loop margin according to the ACK/NACK.

11. A wireless device configured for adjusting a received channel quality indicator, comprising:
    a processor;
    memory in electronic communication with the processor;
    instructions stored in the memory, the instructions being executable by the processor to:
        receive a channel quality indicator (CQI) from a wireless communication device;
        determine a first transmission time interval for which the CQI was generated;
        determine a transmission mode for the first time interval based on stored downlink modes for transmission time intervals and a minimum duration between when the wireless communication device generates the CQI and when the CQI is used to adjust scheduling; and
        adjust the CQI using an outer loop margin, wherein the outer loop margin is dependent on the transmission mode of the first transmission time interval.

12. The wireless device of claim 11, wherein the wireless communication device is a single-input and multiple-output device.

13. The wireless device of claim 11, wherein the transmission mode of the first transmission time interval is multiple-input and multiple-output.

14. The wireless device of claim 11, wherein the outer loop margin adjusts the CQI to reflect better radio frequency conditions than were observed by the wireless communication device.

15. The wireless device of claim 11, wherein the instructions are further executable to schedule downlink transmissions to the wireless communication device using the adjusted CQI.

16. The wireless device of claim 11, wherein the outer loop margin is either a first outer loop margin or a second outer loop margin.

17. The wireless device of claim 16, wherein the outer loop margin is the first outer loop margin when the transmission mode of the first transmission time interval is multiple-input and multiple-output, and wherein the outer loop margin is the second outer loop margin when the transmission mode of the first transmission time interval is single-input and multiple-output.

18. The wireless device of claim 17, wherein the second outer loop margin adjusts a transport block size for downlink transmissions to the wireless communication device.

19. The wireless device of claim 11, wherein the wireless device is a base station that is capable of transmitting using both single-input and multiple-output and multiple-input and multiple-output.

20. The wireless device of claim 11, wherein the instructions are further executable to:
   receive an ACK/NACK from the wireless communication device, wherein the ACK/NACK corresponds to the outer loop margin that was used to generate a transport block size corresponding to the ACK/NACK; and
   adjust the corresponding outer loop margin according to the ACK/NACK.

21. A wireless device configured for adjusting a received channel quality indicator, comprising:
   means for receiving a channel quality indicator CQI from a wireless communication device;
   means for determining a first transmission time interval for which the CQI was generated;
   means for determining a transmission mode of the first transmission time interval based on stored downlink modes for transmission time intervals and a minimum duration between when the wireless communication device generates the CQI and when the CQI is used to adjust scheduling; and
   means for adjusting the CQI using an outer loop margin, wherein the outer loop margin is dependent on the transmission mode of the first transmission time interval.

22. The wireless device of claim 21, wherein the outer loop margin is either a first outer loop margin or a second outer loop margin.

23. The wireless device of claim 22, wherein the outer loop margin is the first outer loop margin when the transmission mode of the first transmission time interval is multiple-input and multiple-output, and wherein the outer loop margin is the second outer loop margin when the transmission mode of the first transmission time interval is single-input and multiple-output.

24. The wireless device of claim 23, wherein the second outer loop margin adjusts a transport block size for downlink transmissions to the wireless communication device.

25. A computer-program product for adjusting a received channel quality indicator, the computer-program product comprising a non-transitory computer-readable medium having instructions thereon, the instructions comprising:
   code for causing a base station to receive a channel quality indicator (CQI) from a wireless communication device;
   code for causing the base station to determine a first transmission time interval for which the CQI was generated;
   code for causing the base station to determine a transmission mode for the first transmission time interval based on stored downlink modes for transmission time intervals and a minimum duration between when the wireless communication device generates the CQI and when the CQI is used to adjust scheduling; and
   code for causing the base station to adjust the CQI using an outer loop margin, wherein the outer loop margin is dependent on the transmission mode of the first transmission time interval.

26. The computer-program product of claim 25, wherein the outer loop margin is either a first outer loop margin or a second outer loop margin.

27. The computer-program product of claim 26, wherein the outer loop margin is the first outer loop margin when the transmission mode of the first transmission time interval is multiple-input and multiple-output, and wherein the outer loop margin is the second outer loop margin when the transmission mode of the first transmission time interval is single-input and multiple-output.

28. The computer-program product of claim 27, wherein the second outer loop margin adjusts a transport block size for downlink transmissions to the wireless communication device.

* * * * *